Patented Oct. 19, 1943

2,332,285

UNITED STATES PATENT OFFICE 2,332,285

PRODUCTION OF ALUMINUM SULPHATE SOLUTIONS

William S. Wilson, Brookline, Mass., assignor to Monsanto Chemical Company, St. Louis, Mo., a corporation of Delaware No Drawing. Application August 2, 1940, Serial No. 350,079

16 Claims. (Cl. 23—123)

The present invention relates to methods for preparing aqueous solutions of aluminum sulphate of high basicity, particularly solutions having basicities of 22% or higher.

Basic aluminum sulphate is aluminum sulphate which contains materially less sulphuric acid than that required by the formula $Al_2(SO_4)_3$, or which contains alumina in excess of that required by the formula $Al_2(SO_4)_3$, otherwise frequently written as $Al_2O_3 \cdot 3SO_3$. It is convenient to refer to the alumina present as excess alumina in terms of basicity or percentage basicity. Thus, a product having a total alumina content of 11 parts in the hundred, of which 8.5 parts are required by the formula $Al_2O_3 \cdot 3SO_3$ and 2.5 parts are in excess, may be said to have 11% total alumina and a basicity, or percentage basicity, of 22.7%

$$\left(\frac{2.5}{11} \times 100\right)$$

Numerous methods have been devised for making solutions of basic sulphates of alumina such as for example, the careful calcination of ammonia alum or aluminum sulphate with volatilization of one of the 3 $SO_3$ groups, after which the sulphate is dissolved in water. Most of these prior methods, however, have resulted in basic sulphates having basicities of less than 22%. The Bradner patent, No. 1,663,435, for example, describes the preparation of basic sulphates by digesting bauxite or other aluminous material with aluminum sulphate solution containing from 7 to 12% combined alumina at a temperature between 90 and 105° C. In accordance with the methods described in his disclosure, however, Bradner operates solely in the liquid phase, and in so doing cannot possibly produce sulphates having a basicity higher than 21 to 22%.

Another previously patented method involves the production of high basic aluminum sulphate liquors by reacting lime and a neutral aluminum sulphate solution in accordance with the following equation:—

$$Al_2(SO_4)_3 + Ca(OH)_2 = Al_2(OH)_2(SO_4)_2 + CaSO_4$$

This method, however, involves the necessity of separating out an insoluble calcium sulphate mud, and requires the removal of one-third of the sulphate radical as a useless material. Moreover, it also results in a contamination of the liquor with small amounts of CaO.

It is accordingly an important object of the present invention to provide a method of producing solutions of aluminum sulphate having basicities of at least 22%.

A further object of the invention is to provide a method of producing aluminum sulphate liquors having basicities of 33⅓%, which liquors or solutions are highly useful commercially for preparing soluble products of unusually high alumina content.

A still further object of the invention is to provide a method of preparing solutions of aluminum sulphate of exceptionally high basicity, which does not involve the removal of a portion of their value in the form of mud nor a contamination of the final liquor.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The invention, in general, is based upon the discovery that it is impossible to obtain an aluminum sulphate of a basicity higher than about 22% unless solid crystals are first formed which are subsequently treated to obtain a pure liquor having the desired basicity. Thus, the invention may be suitably carried out by first preparing a crude crystal which contains from about 20 to 24% $Al_2O_3$ and about 3 to 8% of insoluble matter consisting of unused aluminous material and insoluble matter originally present in the raw material, and has a basicity of 22-34%. This crude crystal is then dissolved or leached to form a solution containing from 2 to 11% $Al_2O_3$. The resulting solution is then permitted to settle or clarify, and is freed of mud or like material.

To obtain the impure or crude crystals referred to above, aluminous material such as bauxite, aluminum hydrate and the like is permitted to react at temperatures of 80–108° C. with aqueous solutions of aluminum sulphate which may be prepared in any desired way before or during the reaction and which contain at least 13% $Al_2O_3$. It is preferred however, to form the aluminum sulphate solution in situ by reaction of aluminous material with sulphuric acid and water.

If desired, any ferric iron present in the crystal may be reduced to ferrous iron, this being suitably accomplished during the leaching step.

A more complete understanding of the invention will be obtained from the following examples, which show different ways of obtaining a crystal of about 33½ basicity:

Method 1.—780 pounds of aluminum hydrate are added to 1400 pounds of sulphuric acid of 73% concentration and mixed to a uniformly dispersed slurry at room temperature. This slurry is then transferred to a closed container of any suitable construction, such as the dens used at present in the commercial manufacture of phosphate fertilizers. Reaction starts almost immediately in the den, and this raises the temperature of the mass to about 125 to 130° C. The temperature is allowed to drop to within the limits of 90 to 105° C., but no lower. The mixture is allowed to stand for 12 to 20 hours, when the cover of the container is removed and the solid mass removed from the den. This solid mass results in a mixture of crystals of the formula $Al_2O_3.2SO_3.9H_2O$ with a small amount of insoluble matter consisting of unused hydrate of alumina.

*Method 2.*—770 pounds of bauxite having about 62% $Al_2O_3$ are stirred into 450 pounds of water in a suitable lead lined container equipped with a stirring mechanism and heating and cooling coils. When the bauxite is completely mixed to a uniform slurry 1000 pounds of sulphuric acid of 93% concentration 66° Bé.) are added. The heat of dilution of the acid along with the heat of reaction serves to rapidly evaporate water and yield a neutral liquor containing 16.5–17.0% of combined $Al_2O_3$ having a temperature of 120–125° C. when the neutral point has been reached. 110 pounds of bauxite which has been made into a slurry in 100 pounds of water are stirred into the resulting liquor. After mixing, the product, which is still in a fluid state, is dropped to an open container where it is maintained at a temperature of 90 to 108° C. for 18 to 30 hours. At the end of this time the mixture contains a total soluble $Al_2O_3$ content of about 21 to 23%, and has a basicity of 33⅓%, which is substantially equivalent to aluminum sulfate having the formula $Al_2O_3.2SO_3.9H_2O$. The mass will also contain insoluble matter present in the bauxite as well as any excess bauxite. The excess bauxite can be recovered in a subsequent dissolving and settling stage, and treated with a suitable acid to recover the alumina values, which may be returned to the mixing tank.

In accordance with this method of operation heat of reaction and acid dilution is relied upon to evaporate the water in the mixer. Evaporation in the crystallizing container or den is also facilitated by keeping it open.

*Method 3.*—Clear neutral aluminum sulphate liquor produced by reacting sulphuric acid and aluminous bearing material in accordance with any conventional method, is boiled down to a concentration of about 16.8% of combined alumina. Bauxite or other aluminous material is then stirred into the mass in such a way as to obtain a thorough and complete dispersion. For each 102 pounds of combined $Al_2O_3$ present as neutral aluminum sulphate in the strong liquor, 51 to 55 pounds of available alumina present in the aluminous material must be added. Thus, when using a commercial bauxite of 62% $Al_2O_3$ content, 83 to 86 pounds are required. The well dispersed material is then permitted to flow or is pumped into a crystallizing vessel or den which is maintained at a temperature of 90 to 104° C. Under these conditions reaction, which is characterized by the formation of a crystalline solid product, is completed in from 18 to 30 hours.

Any type of mixing tank is suitable for making the crystallization mixtures. However, the actual crystallization is preferably carried out in the dens of the type previously mentioned. These are usually large enough to receive several batches from the mixing tank, and this is desirable as the conservation of heat to maintain the desired temperature range during crystallization is greater with a larger mass, and therefore the amount of added heat energy required will be reduced.

Crystallization in the dens may be accelerated by seeding the mass with previously formed crystals immediately before running the same into the crystallization vessel. This may be disadvantageous however as sufficient time should be allowed for the mother liquor to react to the utmost with the bauxite or other aluminous material during the crystallization stage.

The temperatures in the reaction vessel or den should preferably be about 104 to 106° C., as this permits completion of the crystallization in from 12 to 20 hours. The reaction will go to completion at 90° C., however, in the production of 33⅓% basic crystals, if the crystallizing time is increased to 24 to 30 hours. Care must be taken however, that the mass does not cool down below 80° C., as at that temperature it will freeze and effectively stop the reaction. It is preferable to employ as high a temperature as possible, as then the maximum fluidity of the reacting material is obtained. However a temperature in excess of 108° C. should not be employed, as this causes a loss of yield due to the formation of insoluble basic compounds.

Although the above description and examples are primarily concerned with the production of an impure crystal having a basicity in the neighborhood of 33⅓% and an $Al_2O_3$ content of about 24%, it is also possible by similar methods to produce a mixture of crystals and mother liquor having a basicity anywhere within the range of 22 to 33% and an $Al_2O_3$ content within the range of about 16 to 23%.

In preparing solutions having basicities of less than 33⅓%, the above procedures are followed with the exception that either the amount of aluminous material is reduced, or if it is kept constant, the amount of acid is increased. It is also possible to obtain products having basicities less than 33⅓% by using the same quantities of starting materials described above but operating at lower temperatures in the den, such as by reducing the steam pressure in the coils. The latter method is not as economical however as the method which involves changing the amount of aluminous material used.

The product obtained in accordance with the preferred methods described above is a crude crystal of $Al_2O_3.2SO_3.9H_2O$ containing from 20 to 24% total $Al_2O_3$ and 3 to 8% insoluble matter, consisting of unused aluminous material and insoluble matter originally present in the raw material. Although this crude product is applicable for water purification, where the sludge does not interfere with the process, for most uses it requires conversion to a pure insoluble free material, and also may require reduction of any ferric iron present to the ferrous state. This conversion to a pure product is obtained in general by first dissolving or leaching the impure crystal with water to obtain a solution having an $Al_2O_3$ content of 2 to 11%, with or without simultaneous reduction of the ferric iron. This is followed by a settling or clarification treatment, after which the resulting mud or sludge is removed.

Any suitable form of dissolving equipment or leaching apparatus may be used, and the leaching may be carried out either continuously or by batch operation. When the material is also reduced, the temperature is preferably maintained at about 70 to 80° C., reduction being preferably accomplished by adding to the solution H₂S gas or other similar reducing agent in sufficient quantity to provide complete reduction.

An alternative method of reducing the ferric iron to the ferrous state is to permit the clear unreduced liquor to flow down a tower containing metallic aluminum while maintaining a temperature of about 70° C.

After the reduction is complete, or upon completion of the leaching, if the material is not reduced, the liquor is allowed to settle, or alternatively can be filtered, yielding a clear liquor of 2 to 11% Al₂O₃ content which is free of insolubles and suitable for the manufacture of pure reduced aluminum sulphate crystals of high basicity.

The liquors obtained in accordance with the methods described herein may be worked or used in numerous ways well known in the art, such as in the sizing of paper and the clarification of water. It is most advantageous however to employ them in the preparation of high basic crystals according to the methods described in another application of mine which is being filed simultaneously herewith.

What is claimed is:

1. The method of preparing solutions of aluminum sulphate having a basicity between 22 and 34% which comprises preparing a reaction mixture containing as reacting components Al₂O₃, SO₃ and water in such proportions as to produce upon reacting and allowing it to stand at temperatures above 80° C. impure crystals of water soluble aluminum sulphate having the formula Al₂O₃.2SO₃.9H₂O, maintaining the reacting mixture at temperatures between 80 and 108° C. until it completely reacts and sets to a substantially solid mass containing varying amounts of said crystals and mother liquor and having a total water soluble Al₂O₃ content varying from 16 to 24%, and then leaching the resulting crystals with water.

2. The method of preparing solutions of aluminum sulphate having a basicity between 22 and 34% which comprises reacting aluminous materials with sulphuric acid and water in such proportions that impure crytals of the formula Al₂O₃.2SO₃.9H₂O are formed upon permitting the reacting mixture to stand at temperatures above 80° C., maintaining the reacting mixture at temperatures between 80 and 108° C. until it completely reacts and sets to a substantially solid mass containing varying amounts of said crystals and mother liquor and having a total water soluble Al₂O₃ content varying from 16 to 24%, and then leaching the resulting crystals with water.

3. The method of preparing solutions of aluminimum sulphate having a basicity between 22 and 34% comprises reacting aluminous materials with sulphuric acid and water in sufficient amounts to produce a supersaturated solution of neutral aluminum sulphate, reacting the resulting supersaturated solution with additional aluminous materials sufficient to produce impure crystals of the formula Al₂O₃.2SO₃.9H₂O upon permitting the reacting mixture to stand at temperatures above 80° C., maintaining the reacting mixture at temperatures between 80 and 108° C. until it completely reacts and sets to a substantially solid mass containing varying amounts of said crystals and mother liquor and having a total water soluble Al₂O₃ content varying from 16 to 24%, and then leaching the resulting crystals with water.

4. The method of preparing solutions of aluminum sulphate having a basicity between 22 and 34% which comprises reacting aluminous materials with sulphuric acid and water in such proportions as to produce upon subjecting the mixture to evaporation a supersaturated solution of neutral aluminum sulphate, reacting the resulting supersaturated solution with additional aluminous material in amounts sufficient to produce impure crystals of the formula

Al₂O₃.2SO₃.9H₂O upon permitting the reacting mixture to stand at temperatures above 80° C., maintaining the reacting mixture at temperatures between 80° and 108° C. until it completely reacts and sets to a substantially solid mass containing varying amounts of said crystals and mother liquor and having a total water soluble Al₂O₃ content varying from 16 to 24%, and then leaching the resulting crystals with water.

5. The method of preparing solutions of aluminum sulphate having a basicity between 22 and 34% which comprises reacting neutral aluminum sulphate with aluminous material and water in amounts sufficient to produce impure crystals of the formular Al₂O₃.2SO₃.9H₂O upon permitting the reacting mixture to stand at temperatures above 80° C., maintaining the reacting mixture at temperatures between 80 and 108° C. until it completely reacts and sets to a substantially solid mass containing varying amounts of said crystals and mother liquor and having a total water soluble Al₂O₃ content varying from 16 to 24%, and then leaching the resulting crystals with water.

6. The method of preparing solutions of aluminum sulphate having a basicity of about 33⅓% which comprises reacting aluminous materials with sulphuric acid and water in such proportions that a solid mass of impure crystals of the formula Al₂O₃.2SO₃.9H₂O is formed upon permitting the reacting mixture to stand at temperature above 90° C., maintaining the reacting mixture at temperatures between 90 and 106° C. until it completely reacts and sets to a substantially solid mass containing said crystals and a small amount of mother liquor and having a total water soluble Al₂O₃ content of about 24%, and then leaching the resulting crystals with water.

7. The method of preparing solutions of aluminum sulphate having a basicity of about 33⅓% which comprises preparing a solid mass of impure crystals of the formula

Al₂O₃.2SO₃.9H₂O by reacting one mol of aluminum hydrate with one mol of sulphuric acid and two mols of water, and maintaining the reacting mixture at temperatures between 90 and 106° C. until it completely reacts and sets to a substantially solid mass containing said crystals and a small amount of mother liquor and having a total water soluble Al₂O₃ content about 24%, and then leaching the resulting crystals with water.

8. The method of preparing solutions of aluminum sulphate having a basicity of about 33⅓% which comprises reacting bauxite with sulphuric acid and water in such proportions as to produce a solid mass of impure crystals of the formula $Al_2O_3.2SO_3.9H_2O$ upon permitting the reacting mixture to stand at temperatures above 90° C., maintaining the reacting mixture at temperatures between 90 and 106° C. until it completely reacts and sets to a substantially solid mass containing said crystals and a small amount of mother liquor and having a total water soluble $Al_2O_3$ content of about 24%, and then leaching the resulting crystals with water.

9. The method of preparing solutions of aluminum sulphate having a basicity of about 33⅓% which comprises reacting bauxite with sufficient sulphuric acid and water to obtain a solution of neutral aluminum sulphate, evaporating said solution of aluminum sulphate until it contains 16.5 to 17% of combined $Al_2O_3$, reacting the resulting neutral aluminum sulphate solution with additional bauxite sufficient in amount to produce a solid mass of impure crystals of the formula $Al_2O_3.2SO_3.9H_2O$ upon permitting the reacting mixture to stand at temperatures above 90° C., maintaining the reacting mixture between 90 and 106° C. until it completely reacts and sets to a substantially solid mass containing said crystals and a small amount of mother liquor and having a total water soluble $Al_2O_3$ content of about 24%, and then leaching the resulting crystals with water.

10. The method of preparing solutions of aluminum sulphate having a basicity of about 33⅓% which comprises reacting aluminous material with sufficient sulphuric acid and water to obtain a solution of neutral aluminum sulphate containing about 16.5 to 17% of combined $Al_2O_3$, reacting the resulting neutral aluminum sulphate with additional aluminous material in an amount sufficient to produce a solid mass of impure crystals of the formula $AlO_3.2SO_3.9H_2O$ upon permitting the reacting mixture to stand at temperatures above 90° C., maintaining the reacting mixture at temperatures between 90 and 106° C. until it completely reacts and sets to a substantially solid mass containing said crystals and a small amount of mother liquor and having a total water soluble $Al_2O_3$ content of about 24%, and then leaching resulting crystals with water.

11. The method of preparing solutions of aluminum sulphate having a basicity of about 33⅓% which comprises reacting substantially neutral aluminum sulphate with aluminous material and water in amounts sufficient to produce a solid mass of impure crystals of the formula $Al_2O_3.2SO_3.9H_2O$ upon permitting the reacting mixture to stand at temperatures above 90° C., maintaining the reacting mixture at temperatures between 90 and 106° C. until it completely reacts and sets to a substantially solid mass containing said crystals and a small amount of mother liquor and having a total water soluble $Al_2O_3$ content of about 24%, and then leaching the resulting crystals with water.

12. The method of preparing solutions of aluminum sulphate having a basicity of about 22 to 34% which comprises preparing a reaction mixture containing as reacting components $Al_2O_3$, $SO_3$ and water in such proportions as to produce upon reacting and allowing it to stand at temperatures above 80° C. impure crystals of water soluble aluminum sulphate having the formula $Al_2O_3.2SO_3.9H_2O$, maintaining the reacting mixture at temperatures between 80 and 108° C. until it completely reacts and sets to a substantially solid mass containing varying amounts of said crystals and mother liquor and having a total water soluble $Al_2O_3$ content varying from 16 to 24%, then leaching the resulting crystals with water, and removing the mud from the resulting liquor.

13. The method of preparing solutions of aluminum sulphate having a basicity of about 33⅓% which comprises reacting aluminum hydrate with sufficient sulfuric acid and water to obtain a solution of neutral aluminum sulphate, evaporating said solution of neutral aluminum sulphate until it contains 16.5 to 17% of combined $Al_2O_3$, reacting the resulting neutral aluminum sulphate solution with additional aluminum hydrate sufficient in amount to produce a solid mass of impure crystals of the formula $Al_2O_3.2SO_3.9H_2O$ upon permitting the reacting mixture to stand at temperatures above 90° C., maintaining the reacting mixture at temperatures between 90 and 106° C. until it completely reacts and sets to a substantially solid mass containing said crystals and a small amount of mother liquor and having a total water soluble $Al_2O_3$ content of about 24%, and then leaching the resulting crystals with water.

14. The method of preparing solutions of aluminum sulphate having a basicity of about 33⅓% which comprises reacting substantially neutral aluminum sulphate with aluminum hydrate and water in amounts sufficient to produce a solid mass of impure crystals of the formula $Al_2O_3.2SO_3.9H_2O$ upon permitting the reacting mixture to stand at temperatures above 90° C., maintaining the reacting mixture at temperatures between 90 and 106° C. until it completely reacts and sets to a substantially solid mass containing said crystals and a small amount of mother liquor and having a total water soluble $Al_2O_3$ content of about 24%, and then leaching the resulting crystals with water.

15. The method of preparing solutions of aluminum sulphate having a basicity of about 33⅓% which comprises reacting substantially neutral aluminum sulphate with bauxite and water in amounts sufficient to produce a solid mass of impure crystals of the formula $Al_2O_3.2SO_3.9H_2O$ upon permitting the reacting mixture to stand at temperatures above 90° C., maintaining the reacting mixture at temperatures between 90 and 106° C. until it completely reacts and sets to a substantially solid mass containing said crystals and a small amount of mother liquor and having a total water soluble $Al_2O_3$ content of about 24%, and then leaching the resulting crystals with water.

16. The method of preparing crude crystals of aluminum sulphate having an average basicity between 22 and 34% which comprises preparing a reaction mixture containing as reacting components $Al_2O_3$, $SO_3$ and water in such proportions as to produce upon reacting and allowing it to stand at temperatures above 80° C. impure crystals of water soluble aluminum sulphate having the formula $Al_2O_3.2SO_3.9H_2O$, and maintaining the reacting mixture at temperatures between 80 and 108° C. until it completely reacts and sets to a substantially solid mass containing varying amounts of said crystals and mother liquor and having a water soluble $Al_2O_3$ content varying from 16 to 24%.

WILLIAM S. WILSON.